United States Patent
Kuo et al.

(10) Patent No.: US 7,030,783 B2
(45) Date of Patent: Apr. 18, 2006

(54) METHOD FOR SWITCHING NUM LOCK MODE

(75) Inventors: Wei-Yu Kuo, Hsin-Chu (TW); Di-Fei Liu, Hsin-Chu (TW); Yi-Feng Jang, Hsin-Chu (TW)

(73) Assignee: Weltrend Semiconductor, Inc., Hsin-Chu (TW)

( * ) Notice: Subject to any disclaimer, the term of this patent is extended or adjusted under 35 U.S.C. 154(b) by 488 days.

(21) Appl. No.: 10/459,886

(22) Filed: Jun. 12, 2003

(65) Prior Publication Data

US 2004/0160418 A1 Aug. 19, 2004

(30) Foreign Application Priority Data

Feb. 19, 2003 (TW) .............................. 92103465 A

(51) Int. Cl.
*H03M 11/00* (2006.01)
(52) U.S. Cl. ..................... 341/22; 345/168; 345/169
(58) Field of Classification Search .............. 341/22; 455/575.1, 90.2, 566; 345/168, 169, 173; 400/489, 472
See application file for complete search history.

(56) References Cited

U.S. PATENT DOCUMENTS 6,909,423 B1 * 6/2005 Wu et al. .................. 345/168

* cited by examiner

*Primary Examiner*—Michael Horabik
*Assistant Examiner*—Hung Dang
(74) *Attorney, Agent, or Firm*—Anthony R. Barkume, P.C.

(57) ABSTRACT

A method for switching the Num Lock mode of a digital apparatus that is externally coupled with a keypad. When the Num Lock modes of digital apparatus and keypad are different, the keypad transfers the data including a combination code that combines a Num Lock code and a pressed key code to the digital apparatus firstly after any key of the keypad being pressed, and transfers the data including a Num Lock code to the digital apparatus secondly. The main objective of the method according to the present invention is temporally switching Num Lock mode and recovering back to the original mode of the digital apparatus, therefore the input operations of the keypad and the digital apparatus are quite independent and never collision each other.

12 Claims, 3 Drawing Sheets

For single pressed key code or Num Lock code (by USB Interface), there is a one-byte code that can be located in any address from Byte2 to Bte7.
(In USB specification, Byte0 and Byte1 are defined for special usage)

Figure 3(A)

For the combination code that combines pressed key code and the Num Lock code (by USB Interface), there are two one-byte codes that can be located in any address from Byte2 to Byte7.
(In USB specification, Byte0 and Byte1 are defined for special usage)

Figure 3(B)

METHOD FOR SWITCHING NUM LOCK MODE

FIELD OF THE INVENTION

The present invention is related to a method for switching the Num Lock mode of a digital apparatus that is externally coupled with a keypad. By temporally switching Num Lock mode and recovering back to the original mode of the digital apparatus, the input operations of the keypad and the digital apparatus are quite independent and never collision each other.

BACKGROUND OF THE INVENTION

The keypad is an input device for a number, math operation signs and the enter function. It is a very helpful tool for the accounting or financial business related people.

In the prior arts, there are some inconveniences in the usage of the keypad, especially when the keypad is coupled with a notebook computer. Some keys of the notebook keyboard (such as U or J) can be switched to character or numeric input mode by the Num Lock key, and the Num Lock mode of the external keypad that couples with the notebook will be independently switched but not synchronous with the notebook. Therefore, the Num Lock modes of these two devices may be different. But the final input result will be based on the Num Lock mode of the notebook, so the pressed keys of the external keypad are decided by the Num Lock modes of both the keypad and the notebook. Here comes a trouble: when a user wishes to input numbers by keypad, he must sets the Num Lock modes of both the keypad and notebook ON; but when the Num Lock mode of the notebook is ON, some keys of the notebook keyboard, such as U, J, etc., will become number keys. This will inhibit to input U or J via notebook keyboard when the Num Lock mode of keypad is ON, and reduces the convenience of the keypad usage.

SUMMARY OF THE INVENTION

The main objective of the present invention is to improve the design of the keypad, and overcome inconveniences of prior keypad usage by providing a method for switching the Num Lock mode of digital apparatus that is externally coupled with a keypad. When the Num Lock modes of digital apparatus and keypad are different, the keypad transfers the data including a combination code that combines a Num Lock code and a pressed key code to the digital apparatus firstly after any key of the keypad being pressed, and transfers the data including a Num Lock code to the digital apparatus secondly. The method according to the present invention is temporally switching Num Lock mode and recovering back to the original mode of the digital apparatus, therefore the input operations of the keypad and the digital apparatus are quite independent and never collision each other.

For above objective, the present invention provides a method for switching Num Lock mode, and the method provides a digital apparatus externally coupled with a keypad and comprises steps of:

Detecting a state, the state indicates the Num Lock modes of the digital apparatus and the keypad being different; and According to the state, makes the keypad firstly to transfer the data including a combination code that combining a Num Lock code and the key code of a pressed key to the digital apparatus, and secondly to transfer the data including the Num Lock code to the digital apparatus.

In accordance with the method of the present invention, the digital apparatus is a computer.

In accordance with the method of the present invention, the computer is a notebook.

In accordance with the method of the present invention, the computer is a desktop PC.

In accordance with the method of the present invention, the computer is a tablet PC.

In accordance with the method of the present invention, the digital apparatus is a game console.

In accordance with the method of the present invention, the length of the data including the combination code is eight bytes.

In accordance with the method of the present invention, the length of the data including the Num Lock code is eight bytes.

In accordance with the method of the present invention, the keypad transfers the data including the key code of the pressed key to the digital apparatus when the Num Lock modes of the digital apparatus and the keypad are the same.

In accordance with the method of the present invention, the length of the data including the key code of the pressed key is eight bytes.

For above objective, the present invention further more provides a method for switching Num Lock mode, and the method provides a digital apparatus externally coupled with a keypad and comprises steps of:

Detecting a first state, the first state indicates the Num Lock mode of the digital apparatus being OFF and the Num Lock mode of the keypad being ON;

Detecting a second state, the second state indicates the Num Lock mode of the digital apparatus being ON and the Num Lock mode of the keypad being OFF; and According to the first and second state, makes the keypad firstly to transfer the data including a combination code that combining a Num Lock code and the key code of a pressed key to the digital apparatus, and secondly to transfer the data including the Num Lock code to the digital apparatus.

In accordance with the method of the present invention, the keypad transfers the data including the key code of the pressed key to the digital apparatus when the Num Lock modes of the digital apparatus and the keypad are the same.

The present invention may best be understood through the following description with reference to the accompanying drawings, in which:

BRIEF DESCRIPTION OF THE DRAWINGS

FIG. 3(A) shows the standard USB data format.

FIG. 3(B) shows the data including a combination code that combines the pressed key code and Num Lock code.

DETAILED DESCRIPTION OF THE PREFERRED EMBODIMENT

Figure 1:
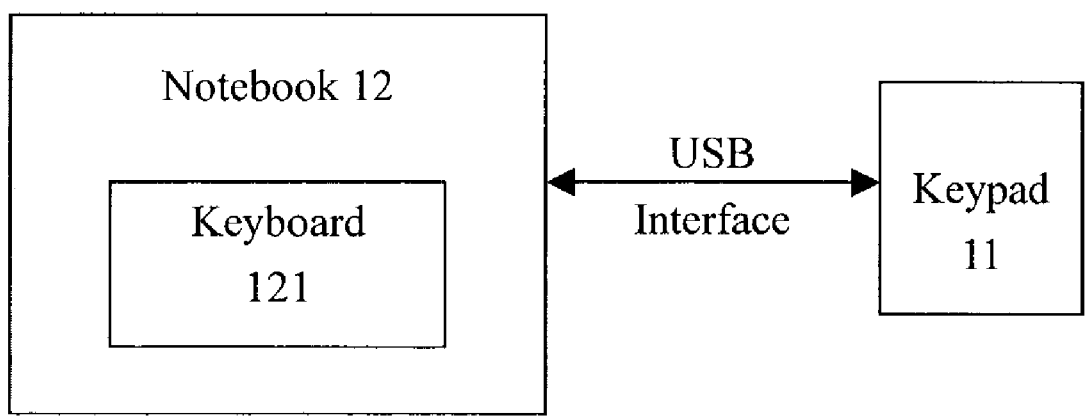
FIG. 1 shows the function block of a preferred embodiment of Num Lock mode switching method according to the present invention.

FIG. 1 shows the function block of a preferred embodiment of Num Lock mode switching method according to the present invention. As shown in FIG. 1, the digital apparatus coupled with keypad 11 is notebook 12, the interface between keypad 11 and notebook 12 is USB, and there is a build-in keyboard 121 in notebook 11.

Figure 2:
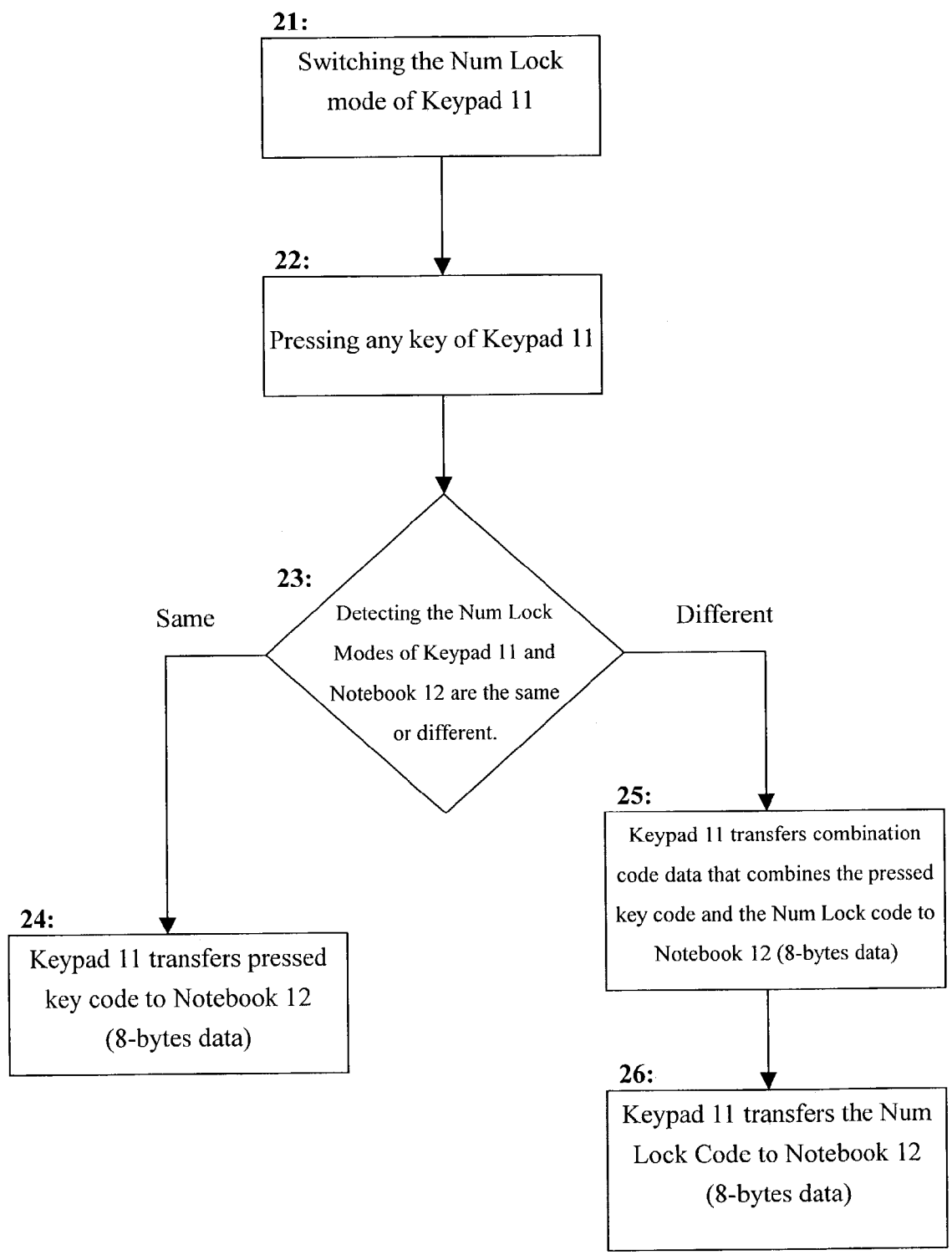
FIG. 2 shows the flowchart of the preferred embodiment of Num Lock mode switching method according to the present invention.

FIG. 2 shows the flowchart of the preferred embodiment of Num Lock mode switching method according to the present invention. The flowchart is comprised steps of:

21: Switching the Num Lock mode of keypad 11 from ON to OFF, or from OFF to ON.

22: Pressing any key on keypad 11.

23: Detecting the Num Lock modes of keypad 11 and notebook 12 are different or not, which can be decided by reading the Num Lock mode of notebook 12 and comparing with the Num Lock mode of keypad 11.

24: When the Num Lock modes of keypad 11 and notebook 12 are the same, that is, the Num Lock modes of keypad 11 and notebook 12 are both ON or OFF, then keypad 11 will transfer the 8 bytes data including the pressed key code to notebook 12 directly. The transferred data format is shown as FIG. 3(A).

25: When the Num Lock modes of keypad 11 and notebook 12 are different, that is, the Num Lock mode of keypad 11 is ON but the Num Lock mode of notebook 12 is OFF, or the Num Lock mode of keypad 11 is OFF but the Num Lock mode of notebook 12 is ON, then keypad 11 will transfer the 8 bytes data including a combination code that contains the pressed key code and Num Lock code to notebook 12 firstly. The transferred data format is shown as FIG. 3(B). The object of step 25 is to ensure notebook 12 can correctly receive the pressed key code from keypad 11 by switching the Num Lock mode of notebook 12 to be the same with the keypad's one. Because notebook 12 receives the Num Lock code and pressed key code at the same time, the present invention is far enhancing than the prior art that needs to transfer 8 Bytes data twice for the same action.

26: After keypad 11 transferring the combination code, it will transfer the data including Num Lock code to notebook 12 to restore the original Num Lock mode of notebook 12. The transferred data format is shown as FIG. 3(A).

It is obvious that the key points of the preferred embodiment according to the present invention are step 25 and step 26 as shown in FIG. 2. The objective of these two steps is temporally switching the Num Lock mode of the digital apparatus and recovering it back to the original mode after the pressed key code has been transferred to the digital apparatus from the keypad. Therefore, if and only if the same steps of the above preferred embodiment according to the present invention included in the comprising steps of any other method, even though additional Num Lock codes are transferred to the digital apparatus from keypad according to the other method, then the other method still be included within the spirit and scope of the present invention.

Moreover, the present invention that provides a Num Lock mode switching method, not only can be applied to the notebook externally coupled with the keypad, but also can be applied to other digital apparatuses such as the desktop PC, tablet PC, and game console, etc.

To sum up, the present invention provides an improving solution for the prior art. By temporally switching the Num Lock mode of the digital apparatus and recovering it back after the pressed key code has been transferred to the digital apparatus from the keypad, the input operations of the digital apparatus and the keypad can be independent and never collision each other. And the improvement of technique according to the present invention is, whenever any key of the keypad is pressed when the Num Lock modes of digital apparatus and keypad are different, the keypad will transfer the data including a combination code that combines a Num Lock code and pressed key code to the digital apparatus firstly, and then transfers the data including the Num Lock code to the digital apparatus secondly. Therefore, for the digital apparatus, it has received the Num Lock code and pressed key code simultaneously. This is far enhancing than the prior art that has to transfer 8-Bytes data twice to achieve the same objective.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims that are to be accorded with the broadest interpretation so as to encompass all such modifications and similar structures.

What is claimed is:

1. A method for switching Num Lock mode, said method providing a digital apparatus externally coupled with a keypad each with a separate Num lock mode and comprising steps of:

detecting a state, said state indicating the Num Lock modes of said digital apparatus and said keypad being different; and according to said state, causing said keypad to first transfer the data including a combination code that represents a Num Lock code and the key code of a pressed key to said digital apparatus, and second to transfer the data representing said Num Lock code to said digital apparatus.

2. The method according to claim 1 wherein said digital apparatus is a computer.

3. The method according to claim 2 wherein said computer is a notebook.

4. The method according to claim 2 wherein said computer is a desktop PC.

5. The method according to claim 2 wherein said computer is a tablet PC.

6. The method according to claim 1 wherein said digital apparatus is a game console.

7. The method according to claim 1 wherein the length of the data including said combination code is eight bytes.

8. The method according to claim 1 wherein the length of the data including said Num Lock code is eight bytes.

9. The method according to claim 1 wherein said keypad transfers the data including the key code of said pressed key to said digital apparatus when the Num Lock modes of said digital apparatus and said keypad are the same.

10. The method according to claim 9 wherein the length of the data including the key code of said pressed key is eight bytes.

11. A method for switching Num Lock mode, said method providing a digital apparatus externally coupled with a keypad each with a separate Num lock mode and comprising steps of:

detecting a first state, said first state indicating the Num Lock mode of said digital apparatus being OFF and the Num Lock mode of said keypad being ON;

detecting a second state, said second state indicating the Num Lock mode of said digital apparatus being ON and the Num Lock mode of said keypad being OFF; and according to said first and second state, causing said keypad to first transfer the data including a combination code that representing a Num Lock code and the key code of a pressed key to said digital apparatus, and second to transfer the data representing said Num Lock code to said digital apparatus.

12. The method according to claim 11 wherein said keypad transfers the data including the key code of said pressed key to said digital apparatus when the Num Lock modes of said digital apparatus and said keypad are the same.

* * * * *